US009813449B1

(12) United States Patent
Buenechea et al.

(10) Patent No.: US 9,813,449 B1
(45) Date of Patent: Nov. 7, 2017

(54) SYSTEMS AND METHODS FOR PROVIDING A SECURITY INFORMATION AND EVENT MANAGEMENT SYSTEM IN A DISTRIBUTED ARCHITECTURE

(71) Applicant: Lookwise S.L., Orcoyen, Navarra (ES)

(72) Inventors: Igor Unanue Buenechea, Zumaia (ES); Victor Jurado Martinez, Madrid (ES)

(73) Assignee: Lookwise S.L., Orcoyen (ES)

( * ) Notice: Subject to any disclaimer, the term of this patent is extended or adjusted under 35 U.S.C. 154(b) by 419 days.

(21) Appl. No.: 13/964,809

(22) Filed: Aug. 12, 2013

Related U.S. Application Data

(60) Provisional application No. 61/681,875, filed on Aug. 10, 2012.

(51) Int. Cl.
*G06F 17/00* (2006.01)
*H04L 29/06* (2006.01)
*H04L 29/08* (2006.01)
*G06F 21/10* (2013.01)

(52) U.S. Cl.
CPC .......... *H04L 63/20* (2013.01); *H04L 63/1416* (2013.01); *H04L 63/1425* (2013.01); *G06F 21/10* (2013.01); *H04L 63/145* (2013.01); *H04L 67/10* (2013.01)

(58) Field of Classification Search
CPC . H04L 63/20; H04L 63/1416; H04L 63/1425; H04L 63/145; H04L 67/10; G06F 21/10
See application file for complete search history.

(56) References Cited

U.S. PATENT DOCUMENTS

| 6,321,338 | B1* | 11/2001 | Porras | H04L 41/142 709/224 |
| 8,601,564 | B2* | 12/2013 | Wahl | H04L 63/1416 726/11 |
| 8,862,665 | B2* | 10/2014 | Murphy | H04L 63/123 709/204 |
| 2006/0053490 | A1* | 3/2006 | Herz | H04L 63/1433 726/23 |
| 2006/0179296 | A1* | 8/2006 | Bartlett | H04L 63/0218 713/152 |

(Continued)

*Primary Examiner* — Eleni Shiferaw
*Assistant Examiner* — Gregory M Elmore
(74) *Attorney, Agent, or Firm* — Morris, Manning & Martin, LLP; Daniel E. Sineway, Esq.; John R. Harris, Esq.

(57) ABSTRACT

A Distributed Security Information and Event Management System (DSIEMS) is a scalable, intelligent, security and fraud management platform that proactively collects information from a network's computer systems, applications, users, and external intelligence data feeds, and aggregates the information into a centralized repository where the information can then be analyzed and quickly acted upon when necessary. Further, according to one aspect, a DSIEMS analyzes aggregated information to discern patterns of potential attack, inappropriate data movement, and fraud from normal and legitimate network activity, account activity, user activity, and data access. According to one embodiment, aspects of the present disclosure are implemented in a distributed architecture. In particular, aspects of the present DSIEMS utilize an agent-based architecture in which intelligent software agents are deployed on each node (e.g., endpoint computing device) within the system.

12 Claims, 10 Drawing Sheets

MESSAGE SUBSCRIPTION & FORWARDING PROCESS
(CORRELATION MODULES)

(56) References Cited

U.S. PATENT DOCUMENTS

| | | | |
|---|---|---|---|
| 2008/0127306 A1* | 5/2008 | Blumfield | H04L 63/1441 726/3 |
| 2010/0082513 A1* | 4/2010 | Liu | H04L 63/1458 706/46 |
| 2011/0010538 A1* | 1/2011 | Falk | H04L 63/06 713/155 |
| 2012/0124200 A1* | 5/2012 | Ramadass | H04L 63/1408 709/224 |
| 2013/0054702 A1* | 2/2013 | Belchee | G06F 21/10 709/206 |
| 2014/0007222 A1* | 1/2014 | Qureshi | G06F 21/10 726/16 |
| 2015/0249685 A1* | 9/2015 | Crane | H04L 63/20 726/1 |

* cited by examiner

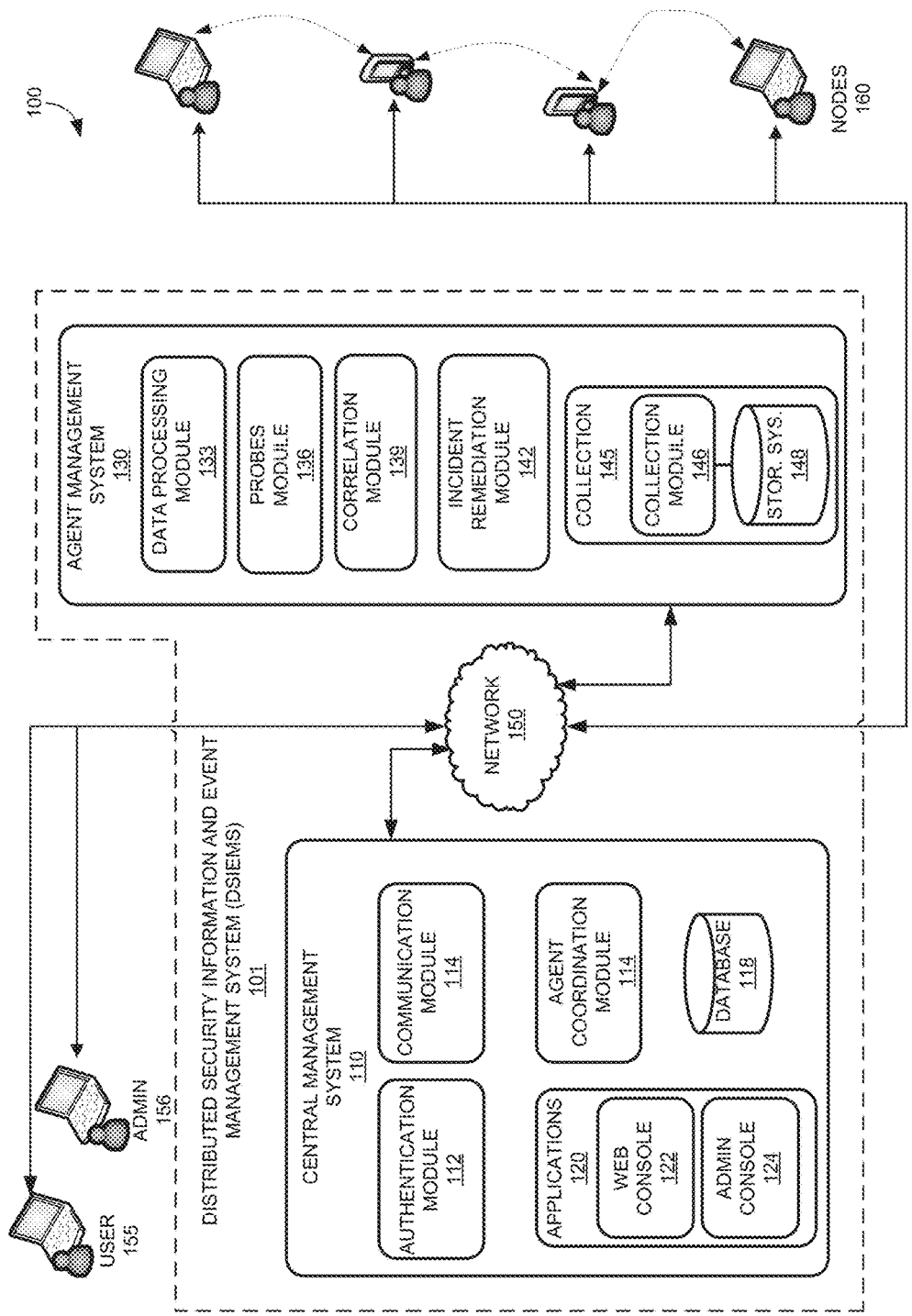
FIG. 1 – OVERVIEW OF DSIEMS ENVIRONMENT

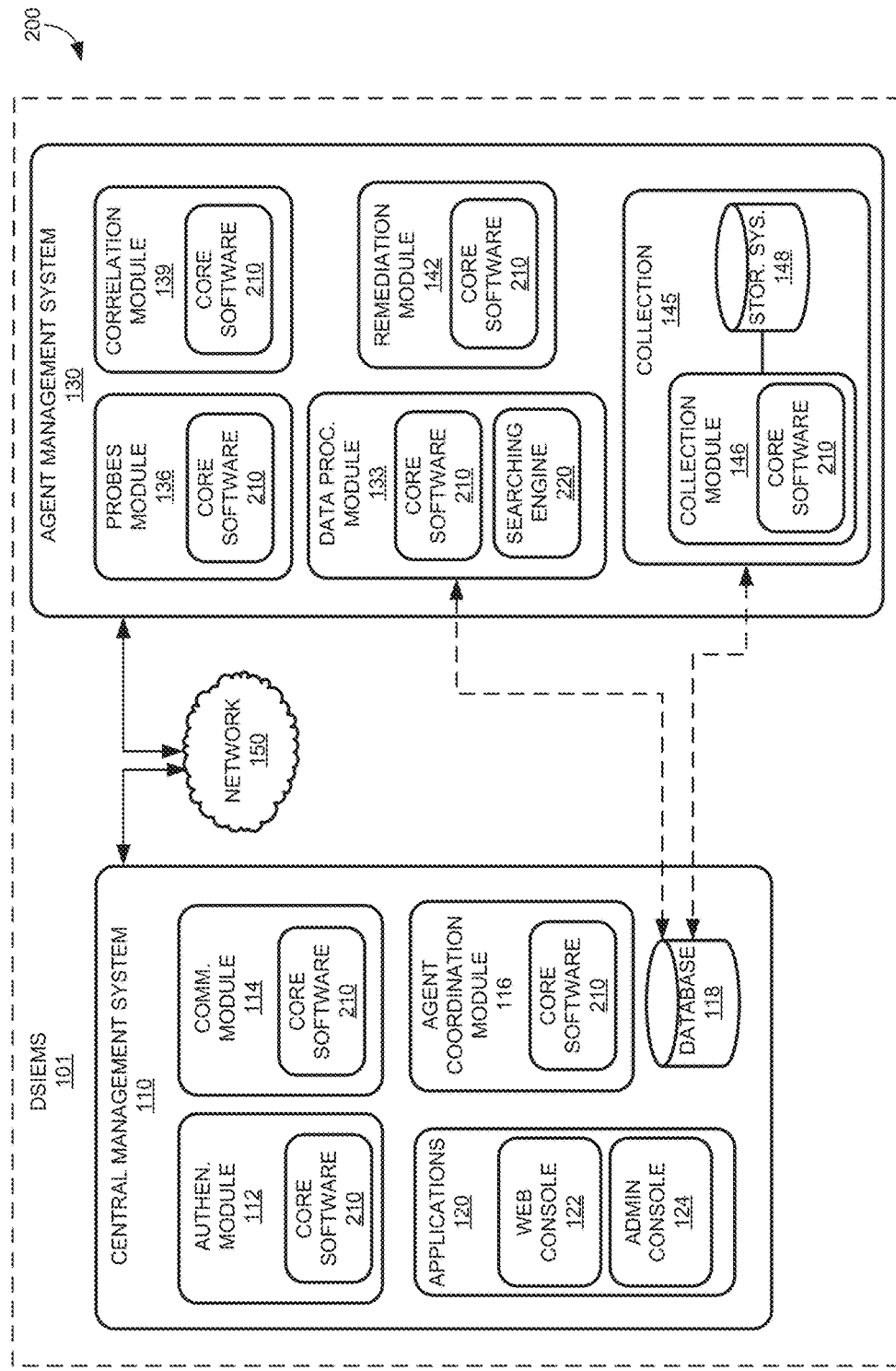
FIG. 2 – EXEMPLARY DSIEMS ARCHITECTURE

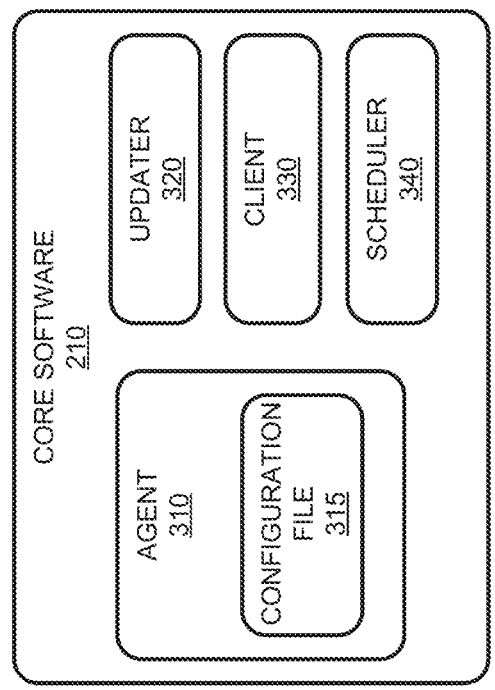
FIG. 3 – CORE SOFTWARE

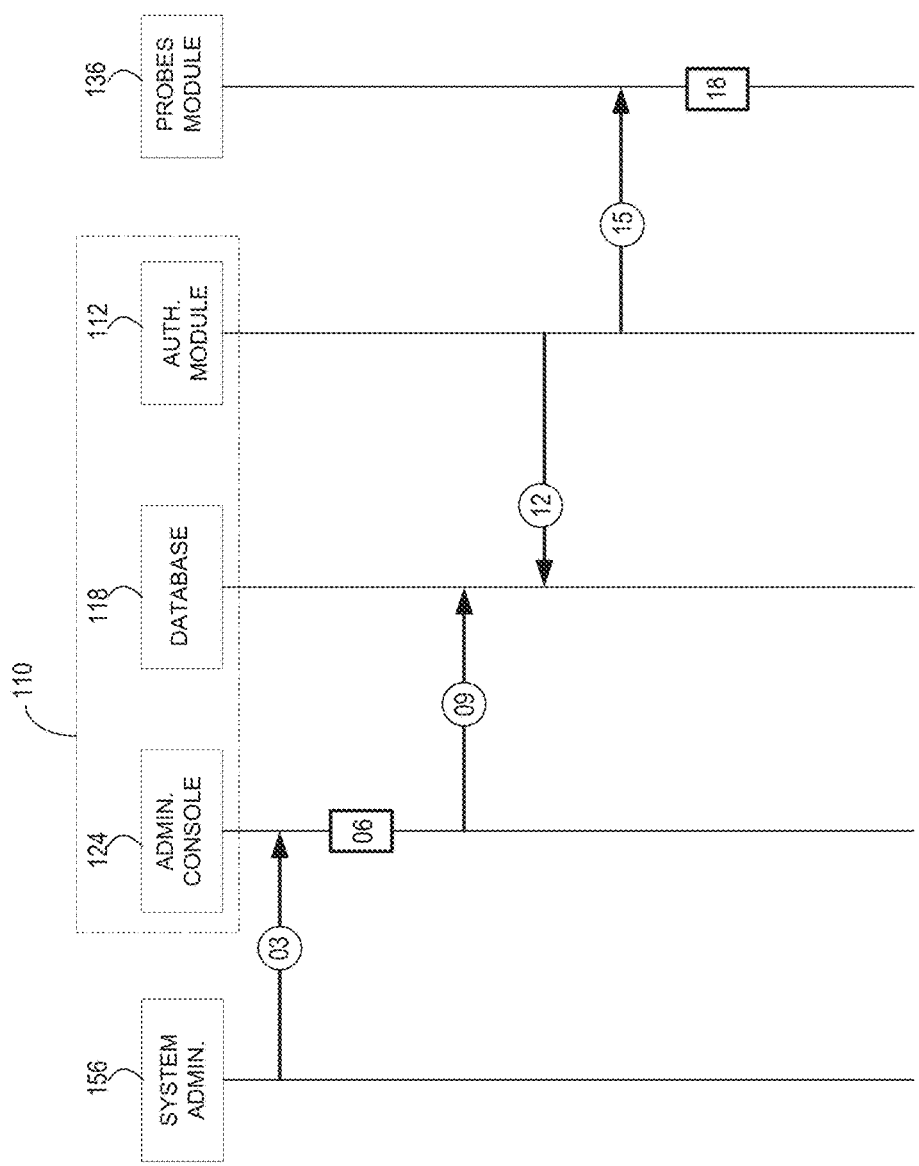
FIG. 4 – MODULE CONFIGURATION

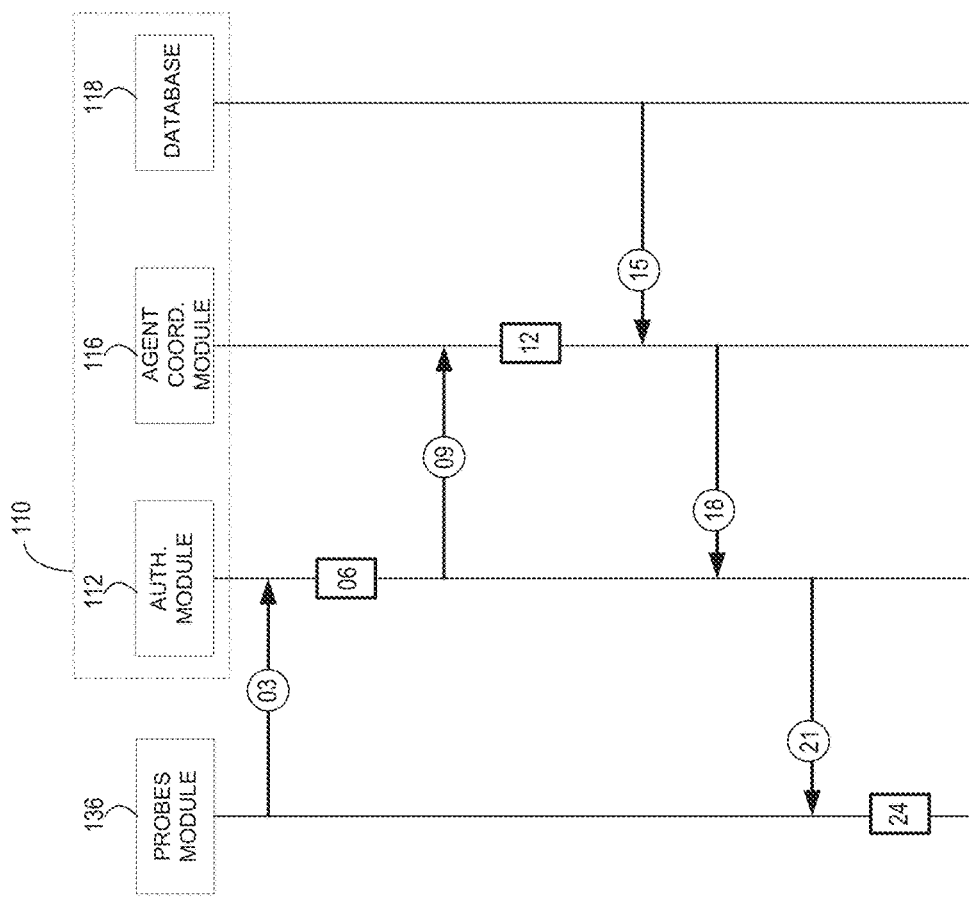

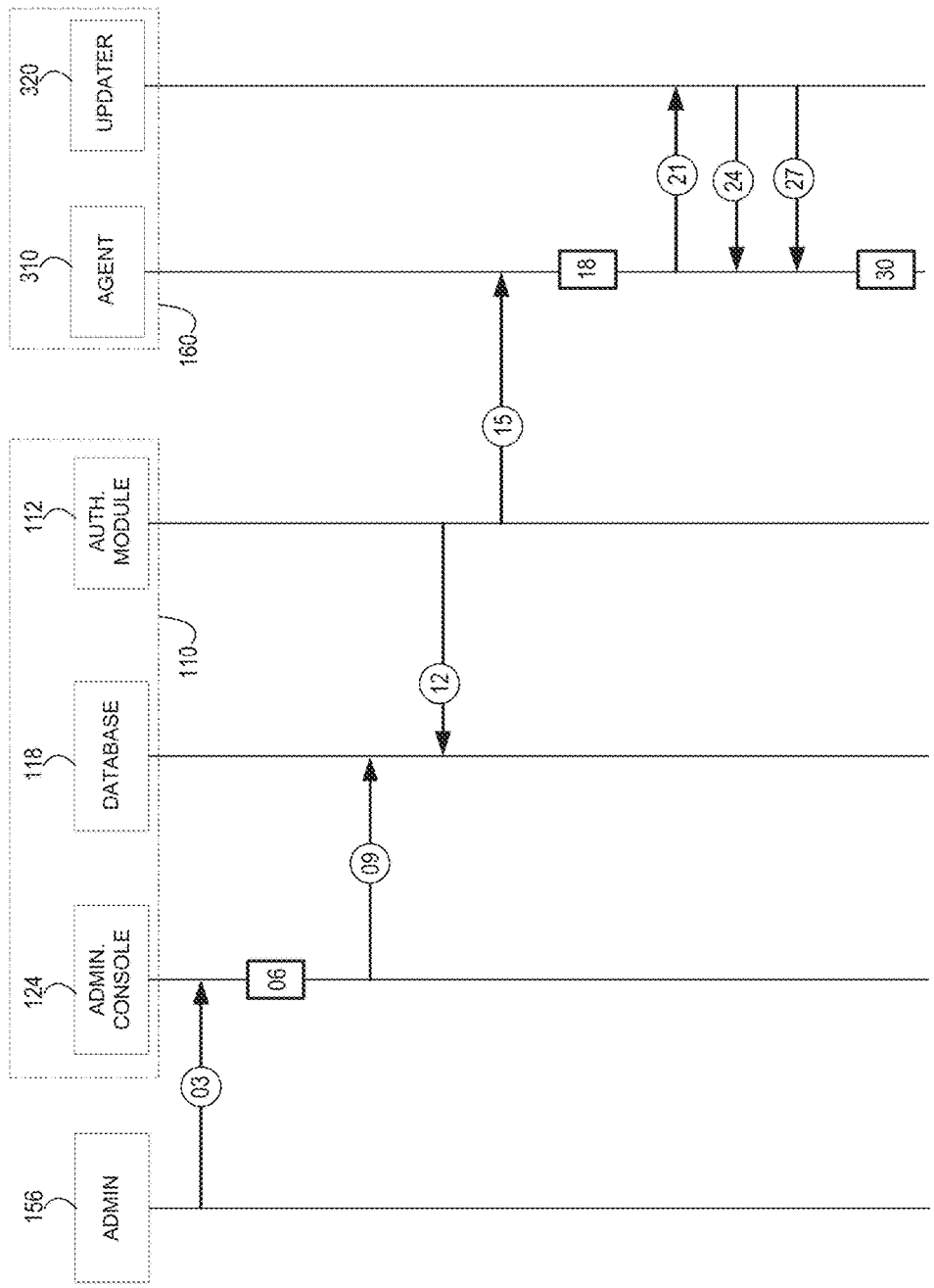

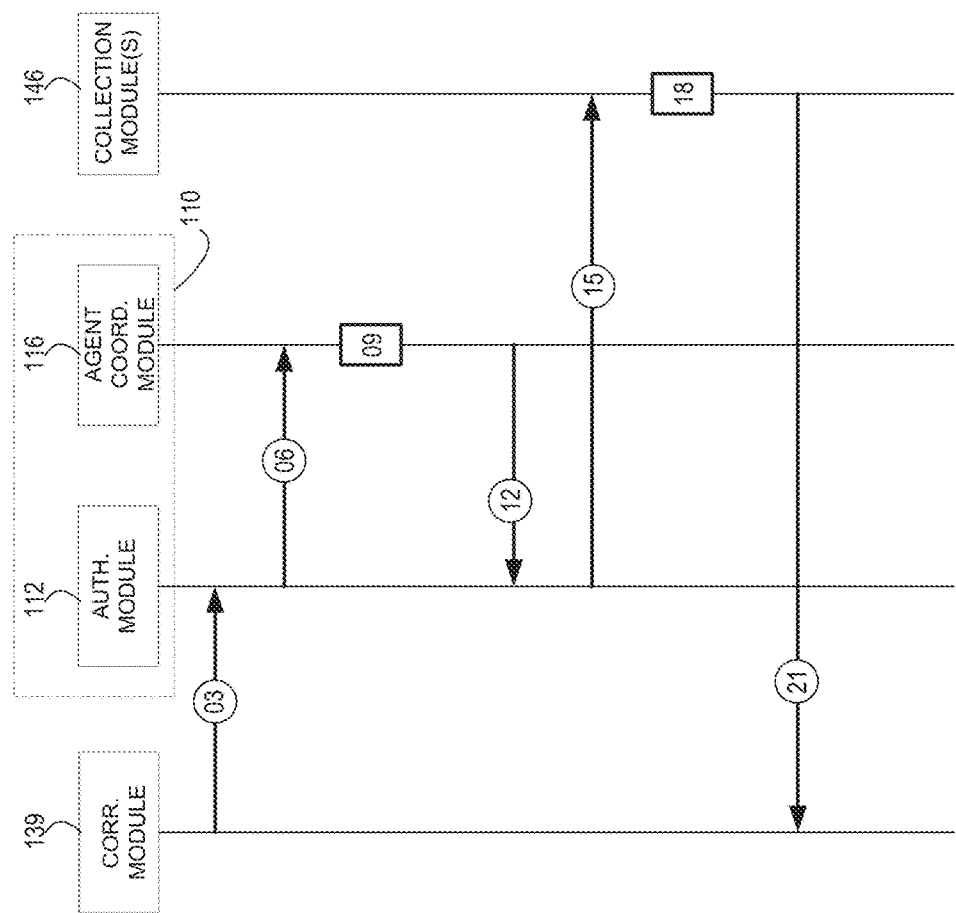
FIG. 7 – MESSAGE SUBSCRIPTION PROCESS (COLLECTION–CORRELATION MODULES)

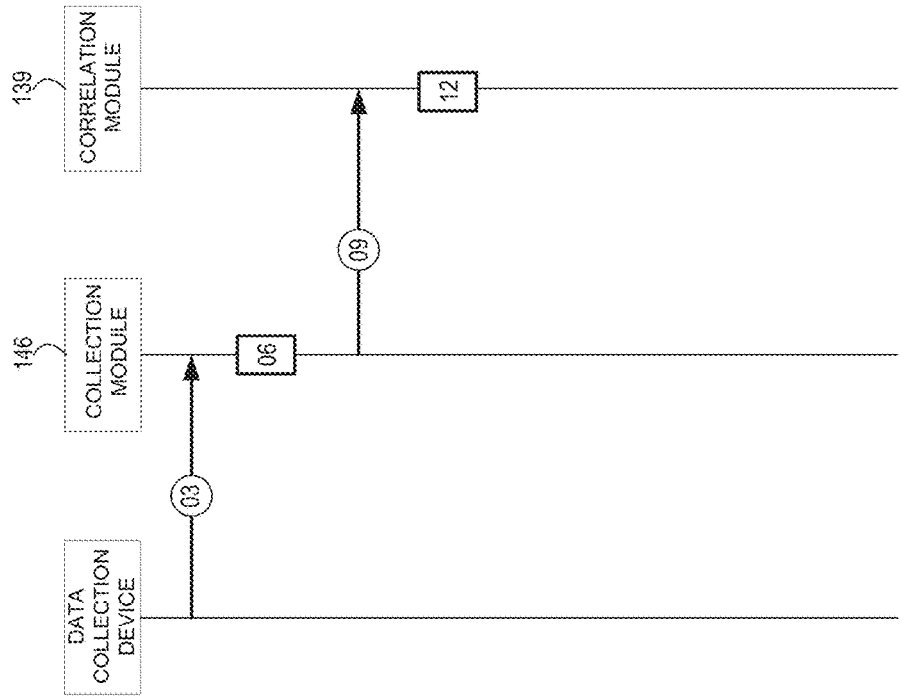
FIG. 8 – LOG MESSAGE FORWARDING PROCESS (COLLECTION-CORRELATION MODULES)

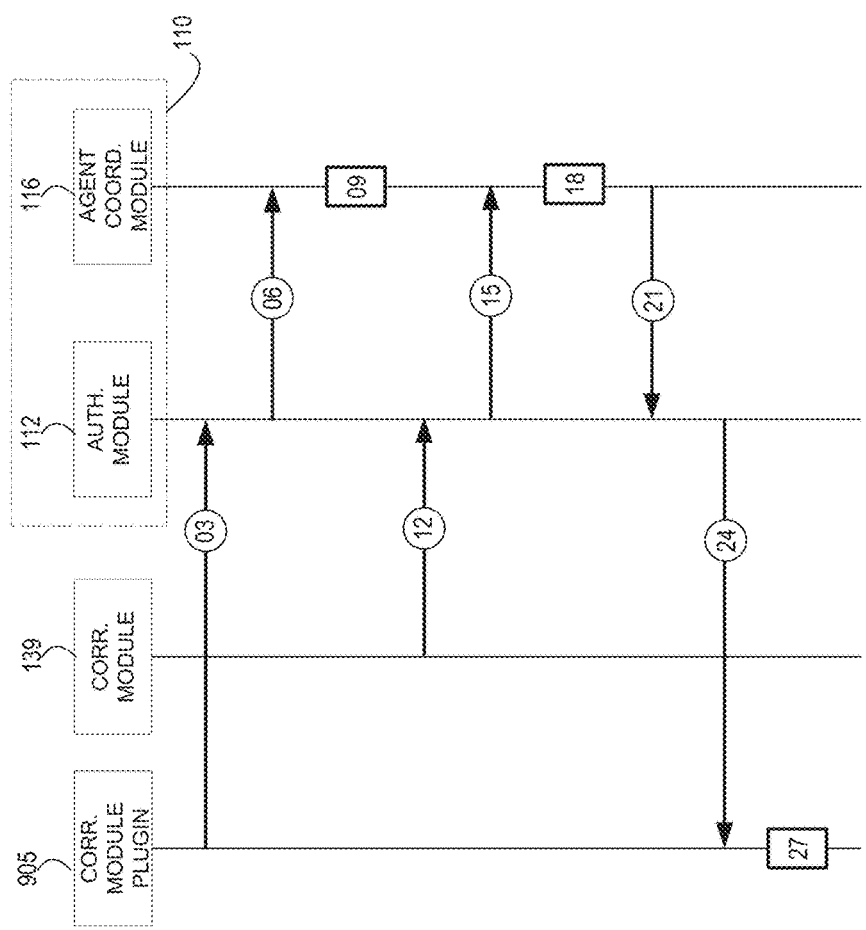
*FIG. 9* – MESSAGE SUBSCRIPTION & FORWARDING PROCESS (CORRELATION MODULES)

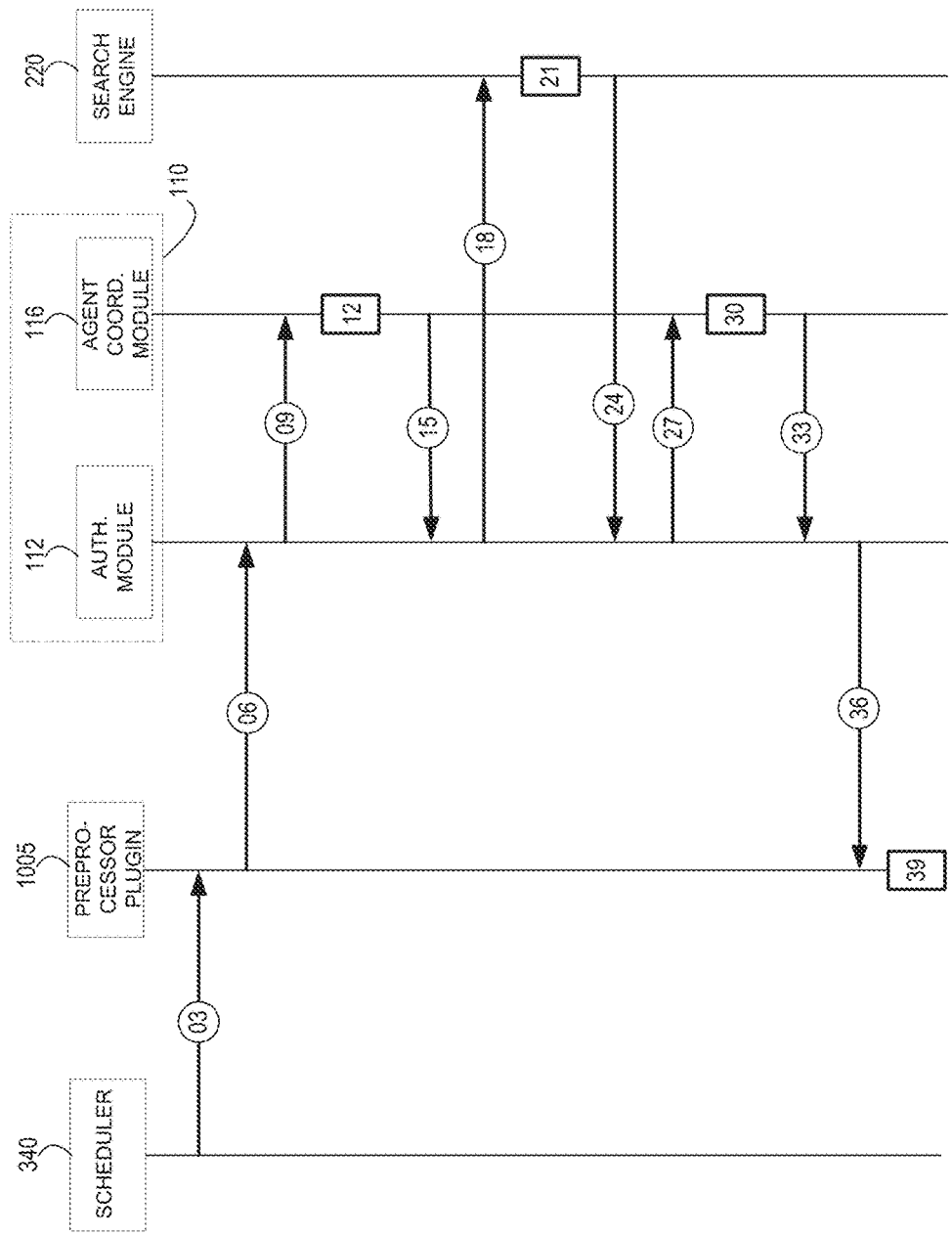

SYSTEMS AND METHODS FOR PROVIDING A SECURITY INFORMATION AND EVENT MANAGEMENT SYSTEM IN A DISTRIBUTED ARCHITECTURE

CROSS REFERENCE TO RELATED APPLICATION

This application claims benefit under 35 U.S.C. §119(e) of U.S. Provisional Patent Application No. 61/681,875, filed Aug. 10, 2012, and entitled "Systems and Methods for Providing a Security Information and Event Management System (SIEM) Based in a Distributed Architecture", which is incorporated herein by reference as if set forth herein in its entirety.

TECHNICAL FIELD

The present systems and methods relate generally to computer hardware and software systems for security information management and security event management, and more particularly to systems and methods for providing a security information and even management (SIEM) system in a distributed architecture.

BACKGROUND

As computer systems have become increasingly complicated and managed computer system networks have grown exponentially, the difficulty in monitoring computer system health and security status has likewise increased. When computer system networks were less sprawling, security devices generated a manageable number of daily events that were manually analyzed by security managers. Today's systems, however, generate many thousands of daily events, far more than can be manually analyzed.

To remedy this issue, Security Information and Event Management (SIEM) solutions were developed. SIEM systems combine both security information management (SIM) and security event management (SEM) functionalities into a centralized system that can provide real-time analysis of the security alerts that are generated by various hardware devices and applications. In general, SIEM systems are capable of gathering, analyzing, and presenting information from: network and security devices; vulnerability management and policy compliance tools; operating system, database, and application logs; and external threat data. Further, SIEM systems generally can identify and access various management applications.

Typical SIEM systems are designed to aggregate security information generated by the various collection devices and applications and subsequently normalize the aggregated information such that the SIEM system can then analyze the information independent of the collection devices. This type of functionality is traditionally accomplished through non-distributed, client-server architectures that require significant effort and processing capabilities each time a new device, node, or user with discrete permissions is added to the system. Such a conventional system configuration is disadvantageous, however, as thousands of daily events collected from a multitude of computer systems in a network causes significant network traffic, which affects the system's efficiency. Further, because not all computer systems in a particular managed network require identical applications and collection devices, the traditional SIEM system architecture makes it difficult to provide custom configuration for each networked computer system, thus limiting system scalability.

Therefore, there is a long-felt but unresolved need for a modular and scalable SIEM system that is flexible, efficient, and allows rapid deployment and modification as needed.

BRIEF SUMMARY OF THE DISCLOSURE

Briefly described, and according to one embodiment, aspects of the present disclosure generally relate to systems and methods for providing a security information and event management (SIEM) system in a distributed architecture.

According to one aspect, a Distributed Security Information and Event Management System (DSIEMS) is a scalable, intelligent, security and fraud management platform that proactively collects information from a network's computer systems, applications, users, and external intelligence data feeds, and aggregates the information into a centralized repository where the information can then be analyzed and quickly acted upon when necessary. Further, according to one aspect, a DSIEMS analyzes aggregated information to discern patterns of potential attack, inappropriate data movement, and fraud from normal and legitimate network activity, account activity, user activity, and data access.

According to one embodiment, aspects of the present disclosure are implemented in a distributed architecture. In particular, aspects of the present DSIEMS utilize an agent-based architecture in which intelligent software agents are deployed on each node (e.g., endpoint computing device) within the system. These intelligent agents enable rapid and customized installation, updating, and removal of software programs and applications that may be necessary at each individual node. In this way, implementing certain functionality at each node need not necessarily be controlled by a central server, but may instead be implemented and controlled by each individual agent. Such an architecture has never before been used in a SIEM system, and enables scalability and flexibility not previously observed in such systems.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an exemplary system environment in which an embodiment of the disclosed distributed Security Information and Event Management (DSIEMS) system is utilized.

FIG. 2 illustrates an exemplary system architecture of a DSIEMS, according to one embodiment of the present disclosure.

FIG. 3 illustrates exemplary core software, according to one embodiment of the present disclosure.

FIG. 4 is a sequence diagram showing an exemplary computer-implemented process for configuring modules from the agent management system, according to one embodiment of the present disclosure.

FIG. 5 is a sequence diagram showing an exemplary computer-implemented module synchronization process, according to one embodiment of the present disclosure.

FIG. 6 is a sequence diagram showing an exemplary computer-implemented process for installing a module on an agent of a remote node, according to one embodiment of the present disclosure.

FIG. 7 is a sequence diagram showing an exemplary computer-implemented process for a correlation module to subscribe to receive messages from a collection module, according to one embodiment of the present disclosure.

FIG. 8 is a sequence diagram showing an exemplary computer-implemented process for a collection module to forward messages to a correlation module, according to one embodiment of the present disclosure.

FIG. 9 is a sequence diagram showing an exemplary computer-implemented process for a correlation module message subscription and forwarding process, according to one embodiment of the present disclosure.

FIG. 10 is a sequence diagram showing an exemplary computer-implemented process for executing and responding to search queries, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Overview

Aspects of the present disclosure generally relate to hardware and software systems for security information management and security event management, and more particularly to systems and methods for providing a security information and event management (SIEM) system in a distributed architecture.

According to one aspect, a Distributed Security Information and Event Management System (DSIEMS) is a scalable, intelligent, security and fraud management platform that proactively collects information from a network's computer systems, applications, users, and external intelligence data feeds, and aggregates the information into a centralized repository where the information can then be analyzed and quickly acted upon when necessary. Further, according to one aspect, a DSIEMS analyzes aggregated information to discern patterns of potential attack, inappropriate data movement, and fraud from normal and legitimate network activity, account activity, user activity, and data access.

According to one embodiment, aspects of the present disclosure are implemented in a distributed architecture. In particular, aspects of the present DSIEMS utilize an agent-based architecture in which intelligent software agents are deployed on each node (e.g., endpoint computing device) within the system. These intelligent agents enable rapid and customized installation, updating, and removal of software programs and applications that may be necessary at each individual node. In this way, implementing certain functionality at each node need not necessarily be controlled by a central server, but may instead be implemented and controlled by each individual agent. Such an architecture has never before been used in a SIEM system, and enables scalability and flexibility not previously observed in such systems.

Exemplary Embodiment

Referring now to the figures, FIG. 1 illustrates an overview 100 of an embodiment of a Distributed Security Information and Event Management System (DSIEMS) 101 in an exemplary environment, constructed and operated in accordance with various aspects of the present disclosure. As shown in the FIG. 1 embodiment, the DSIEMS 101 comprises a central management system 110 and agent management system 130 for carrying out various computer-implemented processes of the DSIEMS 101. Embodiments of the DSIEMS 101 further include various databases and disk file systems for managing and storing system data, such as database 118 and storage system 148. Architectural details showing various software modules, engines, and databases comprising an embodiment of the DSIEMS 101 will be described in greater detail in connection with FIG. 2.

As discussed and according to the FIG. 1 embodiment, a DSIEMS 101 comprises a central management system 110 and agent management system 130, which are operatively connected through a network 150, such as the Internet. Typically, such operative connections involve a secure connection or communications protocol, and communications over a network 150 typically involve the use of one or more services such as a Web-deployed service with client/server architecture, a corporate Local Area Network ("LAN") or Wide Area Network ("WAN"), or through a cloud-based system. According to a further embodiment not shown in FIG. 1 and as will be understood by one skilled in the art, a central management system 110 and agent management system 130 may comprise a unitary system, or the functionalities can be carried out by a consolidated system, and it is unnecessary for these systems to be separate and discrete.

As further shown in FIG. 1, the DSIEMS 101 includes operative connections to a system user 155 and system administrator 156 via a network 150. Various networking components such as routers, switches, hubs etc., are typically involved in such communications, and although not shown in FIG. 1, certain embodiments of the present disclosure may include one or more secure networks, gateways/firewalls that provide information security from unwarranted intrusions and cyber attacks. According to one aspect of the present disclosure, a system administrator 156 is responsible for controlling low-level infrastructure roll out (i.e., deploying the different modules in the distributed architecture and configuring aspects of the DSIEMS 101, as will be discussed further in connection with FIG. 2). A user 155, on the other hand, may be a user of the DSIEMS 101 who accesses the system to carry out high-level reporting or operations tasks.

According to one embodiment, the DSIEMS 101 includes further operative connections to various nodes 160, which generally comprise computing devices with networking capabilities in the DSIEMS 101 network. Generally, a node 160 comprises a computing device (or, potentially a computer system) that is implemented as a special-purpose or general-purpose computer including various computer hardware and software. Examples of nodes include, but are not limited to, personal computers (PCs), tablet computers, laptop computers, mobile devices (e.g., smart phones, cellular phones, etc.), and other intelligent computing devices, such as servers, intelligent printers or copiers, storage devices, and other computing devices. According to one embodiment, the DSIEMS 101 is configured to be multiplatform such that the nodes 160 can be configured with varying operating systems (e.g., one of the WINDOWS family of operating systems from the MICROSOFT CORPORATION, the OSX operating system from APPLE COMPUTER, INC., the LINUX operating system, or another type of operating system known to one of ordinary skill in the art).

As will be discussed further in connection with FIG. 2, in one embodiment, nodes 160 connected to the DSIEMS 101 generally comprise three basic (i.e., core) software components: an agent, updater, and client. Nodes 160 may also comprise a scheduler. According to one aspect, the agent specifies various additional software modules (i.e., plugins or agents), which determine the role of a particular node 160 in gathering event information and sending and/or receiving information to and from the DSIEMS 101. Event information may relate to various security- or fraud-related incidents, including, for example, malicious code or malware (e.g., botnets, internet worms, etc.), phishing (i.e., identify theft attempts), or man-in-the-middle attacks, among others.

As mentioned previously, aspects of the present DSIEMS operate on an agent-based (distributed) architecture that enables installation, updating, removal, and control of individual software applications at the node level. In this way, decisions regarding controls, access permissions, and customization of nodes to be used by system users need not be fully controlled at the central server level, but instead can be managed somewhat autonomously at the node level.

As noted previously, in one embodiment, the DSIEMS 101 comprises a central management system 110. As shown in the FIG. 1 embodiment, the central management system 110 comprises an authentication module 112, communication module, 114, agent coordination module 116, a database 118, and an applications module 120 that comprises both a web console 122 and administrator console 124. As discussed, in one embodiment, a system administrator 156 is responsible for deploying the different modules in the distributed architecture and configuring aspects of the DSIEMS 101, and according to one aspect, the administrator console 124 facilitates the deployment and configuration. For example, a system administrator 156 may generate various configuration files using the administrator console 124. As will be discussed, configuration files specify which dynamic-link libraries and/or plugins are to be loaded onto the various nodes 160. Generally, a system user (e.g., 155) accesses the web console 122 for high-level reporting and operations tasks (e.g., reviewing and acting on information relating to security event data that has been collected and analyzed by the system 101). In one embodiment, the web console 122 comprises a dashboard to facilitate a system user's 155 reporting and operations tasks.

Further, the DSIEMS 101 comprises an agent management system 130, according to one embodiment. As shown in the FIG. 1 embodiment, the agent management system 130 comprises a data processing module 133, probes module 136, correlation module 139, incident remediation module 142, and collection system 145, which comprises a collection module 146 and storage system 148.

The discussions above in association with FIG. 1 are merely intended to provide an overview of an embodiment of the present systems and methods for providing a security information and even management (SIEM) system in a distributed architecture. Accordingly, it will be understood that the descriptions in this disclosure are not intended to limit in any way the scope of the present disclosure. Various architectural details of an embodiment of the disclosed DSIEMS 101 will be described next in greater detail.

FIG. 2 illustrates an exemplary system architecture 200 of a DSIEMS 101 according to one embodiment of the present disclosure. According to one aspect, a DSIEMS 101 is hosted on a third-party physical server or a cloud server. As shown and discussed previously, a DSIEMS 101 comprises a central management system 110 and agent management system 130. According to one embodiment, both the central management system 110 and agent management system 130 are servers or collections of software modules, process, subroutines, or various algorithms operated by an embodiment of the DSIEMS 101.

In one embodiment, the central management system 110 handles the general management functionalities of the DSIEMS, including authentication of system users and nodes, high-level communications functions, data analysis, and other operations. According to one aspect, the agent management system 130 generally manages the library and basic functionalities of all software agents and plugins deployed on various devices (nodes) throughout the system. As will be understood and appreciated, although these systems are shown as separate systems in this disclosure, they can be implemented as a single system (or many multiple systems) in other embodiments of the DSIEMS as will occur to one of ordinary skill in the art.

In the specific embodiment shown in FIG. 2 (and as discussed in relation to nodes 160), each of the modules comprises core software 210. According to one aspect, and as shown in FIG. 3, the core software 210 comprises an agent 310, an updater 320, and a client 330. In one embodiment, the core software 210 also comprises a scheduler 340.

Generally, the agent 310 defines the module or node's overall role in the DSIEMS 101 based on what is specified in the agent's configuration file 315. In one embodiment, the agent 310 is an executable file that runs on the node or module and loads various dynamic-link libraries (DLLs) or plugins as specified by the configuration file 315, which typically is generated by a system administrator 156 via an administrator console 124. In one embodiment, the configuration file 315 is an extensible markup language file (i.e., XML file). As will be understood by one of ordinary skill in the art, a dynamic-link library is a nodule that contains functions and data that can be used by another module (application or DLL) and a plugin is a software component that adds a specific feature to an existing software application. As will be discussed, the agent management system 130 generally manages these various DLLs and plugins that give the nodes and modules functionalities relating to the security information and event management as well as security and fraud management.

Along with the agent 310, the core software 210 also comprises an updater 320, according to one embodiment. Generally, the updater 320 is an executable that accompanies the agent 310 and allows the agent 310 to install, uninstall, or update various DLLs or plugins. Put differently, the updater 320 allows for a change to the configuration of an agent 310. By allowing the flexibility to change the configuration of an agent 310, the DSIEMS 101 can manage newly-added nodes 160, and previously-configured nodes 160 can be updated when necessary. For example, modules (e.g., probes module 136 or correlation module 139) can be added or removed from a given node 160 easily based on minimal instructions provided to an agent residing on the given node. As will be understood and appreciated, the ability to add new nodes 160 or reconfigure previously-existing nodes 160 improves the scalability and flexibility of the overall DSIEMS 101. This improved scalability and flexibility is, in one embodiment, primarily tied to the distributed architecture of the DSIEMS and use of software agents residing on individual nodes. According to one embodiment, these changes and updates can be effected by an updated configuration file 315 created remotely by an administrator 156 or user 155 at an administrator console 124 or web console 122. In one embodiment, the updater 320 manages update, installation, uninstallation, enablement, or disablement of any module or node 160.

As shown in the FIG. 3 embodiment, the core software also comprises a client 330. Generally, the client is a dynamic-link library that ensures connectivity between the module or node 160 and the DSIEMS 101. The client generally communicates directly between the node 160 or module and the authentication module 112 and communication module 114.

Finally, as shown in the FIG. 3 embodiment, the core software 210 may comprise a scheduler 340. In one embodiment, a scheduler 340 is a DLL or plugin that sends scheduled commands to modules that support the particular node in which the scheduler 340 is installed.

As further shown in the FIG. 2 embodiment and as previously discussed, the DSIEMS 101 comprises an agent management system 130. According to one embodiment, the agent management system 130 comprises the various modules (i.e., agents) which are loaded into memory and run on the various nodes 160 as specified by the various configuration files 315. In one embodiment, a module (e.g., correlation module 139 or remediation module 142) is an executable capable of loading various specified dynamic-link libraries or plugins. Further, modules (i.e., agents) have certain intelligence in that they implement certain functionality and provide certain APIs that are used by the plugins that the modules comprise. In one embodiment, the functionality implemented by the module may include common services (e.g., communications (sockets), logging, ciphering, XML parsing, etc.) as well as architecture services (e.g., authentication, sending/receiving commands, etc.). As noted, the various modules provide various functionalities related to security information, event management, and security and fraud management to the various nodes 160. Further, in one embodiment, the various modules are autonomous in that based on predefined filters and rules, they run on start-up and do not require intervention from a central node or module, thus improving the efficiency of the overall DSIEMS 101.

Additionally, according to one embodiment, all nodes 160 and modules are accessible and visible to a system administrator 156 or user 155 via an admin console 124 or web console 122, and therefore the administer 156 or user 155 can distribute various modules (e.g., correlation module 139, etc.) and the associated plugins to specified nodes 160 or modules. As will be understood and appreciated, such a configuration allows for ease of deployment and greater scalability of the overall system.

In one embodiment, a data processing module 133 processes log data collected by the nodes 160 and other modules and then normalizes the data. As previously noted, various managed systems or nodes 160 within a managed system may comprise a plurality of data collections devices, each provided by a different manufacturer and each collecting data in a unique way. According to one aspect, the data processing module 133 processes log data collected by these collection devices and aggregated by the collection module 145 (as will be discussed) and normalizes the data such that it can be reviewed, analyzed, and interpreted and eventually served to the web console 122. According to one embodiment, the data processing module 133 provides the ability to define virtual tables that allow for accessing normalized log data. Further, in one embodiment, the data processing module 133 allows for the ability to access normalized and processed log data via a standardized structured query language (SQL) interface (e.g., a dashboard in the web console 122). According to one aspect, the data processing module 133 preprocesses log data for real-time visualization in a dashboard on the web console 122. According to one embodiment, the data processing module 133 comprises various plugins including a normalization engine that provides a standard SQL interface that allows a system user 155 or other user to access log data as if the log data were presented in a database table. Further, the data processing module 133 comprises a log data preprocessor for generating indicators visible in the real-time dashboard of the web console 122. Additionally, in one embodiment, the data processing module 133 comprises a searching engine 220 that conducts various searches based on queries received from the correlation module 139. Also, the searching engine can receive queries from a user via a dashboard on a web console.

As shown in the FIG. 2 embodiment, the data processing module 130 also comprises a probes module 136. According to one aspect, a probes module 136 gathers data collected by various end devices (e.g., collection devices or nodes) by utilizing various application programming interfaces (APIs) to communicate with the end devices. In one embodiment, the probes module 136 supports three types of APIs, the first of which is an Event Log, which allows the probes module 136 to acquire events from a Windows OS Event Log API. The second API supported by the probes module 136, according to one embodiment, is an FW/1 (i.e., framework-one), which allows the probes module 136 to acquire events from Check Point FireWall-1 central console API. Third, in one embodiment, the probes module 136 supports a text file API which collects event information from text files and also has the ability to filter the events. According to one embodiment, the probes module 136 comprises various plugins for the EventLog API, the FW/1 API, and a text file API.

In one embodiment, the agent management system 130 comprises a correlation module 139. In one embodiment, the correlation module 139 is a rule-based module responsible for evaluating log data in real time and generating alerts. These alerts can then be used to generate system incidents. According to one embodiment, the correlation module 139 subscribes to the collection module 146, and the log data evaluated by the correlation module 139 is acquired directly from the collection module 146. In one embodiment, the correlation module 139 comprises various plugins including a rule-based correlation engine, an engine for converting alerts into system incidents, and an engine for sending alerts to, for example, the dashboard of the web console 122 via standard interfaces such as email or a computer data logging tool such as syslog.

Additionally, the agent management system 130 may comprise an incident remediation module 142, according to one embodiment. Nodes 160 that have installed an incident remediation module 142 are capable of remotely executing binary files. In one embodiment, an incident remediation module 142 comprises a plugin to remotely run the binary files.

Finally, as shown in the FIG. 2 embodiment, an agent management system 130 may comprise a collection system 145 that comprises both a collection module 146 and storage system 148. According to one embodiment, a collection module 146 is responsible from collecting log data from the various collection devices at each node. Typically, the collection module 146 supports both online passive data collection and offline active data collection. Online passive collection typically involves collecting log data from devices that spontaneously send collected log data via standard syslog or Standard Network Management Protocol (SNMP) interfaces. Offline active collection, on the other hand, generally involves actively collecting log data from devices that are unable to spontaneously send the log data upon collection. Typically, offline active collection utilizes standard File Transfer Protocol (FTP) or SSH File Transfer Protocol (SFTP). Generally, the collection module 146 stores data logs in their native format in the storage system 148. In one embodiment, the storage system 148 is a storage system or disk file system. Typically, disk file systems are file systems that manage data on permanent storage devices such as magnetic disks. As will be understood and appreciated, a disk file does not limit the volume of data that can be retained by the storage system 148 and allows log data to be stored in native format without being manipulated. As will be further understood and appreciated, aspects of the present disclosure are not limited to disk storage systems, and other databases or storage systems may be used as will occur to one of ordinary skill in the art. In one embodiment, the collection module 146 comprises an online passive collector plugin and an offline active collector plugin.

As further shown in the FIG. 2 embodiment and as previously discussed, the DSIEMS 101 comprises a central management system 110. According to one embodiment, the central management system 110 comprises an authentication module 112, communication module 114, agent coordination module 116, database 118, and applications system 120 comprising a web console 122 and admin console 124.

According to one embodiment, the authentication module 112 (i.e., authentication server) serves as the main server (i.e., first-level server) of the DSIEMS 101 and is in charge of authenticating clients that attempt to join the network, which involves authenticating them against information stored in the database 118 and updating the database 118 accordingly. Further, it maintains communication with the communication module 114 (i.e., communication server). Additionally, in one embodiment, the authentication module 112 maintains a comprehensive, up-to-date view of the network being managed by the DSIEMS 101. Finally, the authentication module 112 manages and coordinates communications between the web console 122 or admin console 124 and the various modules (e.g., data processing module 133, probes module 136, etc.). According to one aspect, such communications include network commands, command workflow, alerts, reports, etc. Additionally, the authentication module has connectivity with the database 118 and keeps the database 118 updated with an updated view of the DSIEMS 101 and all nodes 160 and modules being managed by the system 101. Further, in one embodiment, the authentication module tracks module management including the number of licenses issued. Further, according to one embodiment, the authentication module 112 comprises an authentication server plugin.

As shown in the FIG. 2 embodiment, the central management system 110 also comprises a communication module 114. In one embodiment, the communication module 114 (i.e., communication server) is the second-level server of the DSIEMS 101 and is responsible for concentrating the connections for the various nodes 160 and other modules. Additionally, the communication module 114 dispatches commands, reports, and alerts between the authentication module 112 and the various clients 330 in the system 101, and vice versa. For example, according to one aspect, the authentication module 112 may send a single request to be delivered to a plurality of clients 330, and the communication module 114 then coordinates the delivery of the requests. Further, according to one embodiment, the authentication module 112 comprises a connection manager plugin.

Additionally, as shown in the FIG. 2 embodiment, the central management system 110 comprises an agent coordination module 116 (i.e., core module), which coordinates direct communication between the various modules in the agent management system (i.e., probes module 136, data processing module 133, correlation module 139, remediation module 142, and collection module 146). Further, according to one embodiment, the agent coordination module 116 assists in the remote configuration of the various modules. In one embodiment, the central management system 110 comprises a core module plugin to assist in coordinating such communications.

FIG. 4 represents a sequence diagram illustrating an exemplary process whereby a module from the agent management system 130 (e.g., data processing module 133, probes module 136, etc.) is configured from an admin console 124. In one embodiment, the specified functionality may be configured from a web console 122. Typically, the process illustrated by the FIG. 4 sequence diagram occurs when a user 155 or system administrator 156 wants to configure a module (e.g., probes module 136). As shown in FIG. 4, at 403, a system administrator 156 loads configuration information relating to the specified module (e.g., probes module 136) into the administrator console 124. In one embodiment, at 406, upon receipt of the configuration information, the administrator console 124 generates a command (i.e., configuration file) comprising the specified configuration information. At 409, according to one embodiment, the configuration information and command are saved to the database 118. Subsequently, at 412, the authentication module 112 retrieves the command comprising the configuration information from the database 118 and transmits the command (i.e., configuration file) to the specified module (i.e., probes module 136), at 415. Upon receipt of the command, in one embodiment, the specified module (i.e., probes module 136) processes the command and loads the proper configuration. As discussed previously, in one embodiment, the agent 310 of the module receives and processes the configuration file 315.

FIG. 5 represents a sequence diagram illustrating an exemplary process whereby a module (e.g., probes module 136) requests configuration instructions from the central management system 110. As shown in the FIG. 5 embodiment, at 503, the probes module 136 (or other module in the agent management system 130) transmits a configuration request to the central management system. In one embodiment, the module (e.g., probes module 136) sends the request upon connecting to the DSIEMS 101 for the first time. Next, in one embodiment, the authentication module 112 receives and processes the configuration request, at 506. Subsequently, at 509, upon determining the received request is a configuration request, the authentication module 112 transmits the request to the agent coordination module 116. In one embodiment, the agent coordination module 116 then processes the request to determine the proper configuration for the module making the request (i.e., probes module 136), at 512. Upon determining the proper configuration, at 515 the agent configuration module 116 retrieves the proper configuration from the database 118, according to one embodiment. The agent configuration module 118 then transmits a response comprising the proper configuration to the authentication module 112, at 518. At 521, the authentication module 112 transmits the response comprising the proper configuration to the module that initially requested configuration instructions (i.e., probes module 136). Finally, in one embodiment, upon receipt of the response, the probes module 136 processes the response and loads the configuration, at 524. As discussed previously, in one embodiment, the agent 310 of the module receives and processes the configuration file 315.

FIG. 6 represents a sequence diagram illustrating an exemplary process whereby a module (e.g., probes module 136) is installed on a node 160. As previously noted, in one embodiment, nodes generally include core software 210, which comprises an agent 310 and updater 320, as shown in the FIG. 6 embodiment. According to one embodiment, at 603, a user 155 or administrator 156 specifies a particular module from the agent management system 130 (e.g., probes module 136) to be installed on a specified node 160, and the administrator 156 loads the command into the admin console 124. At 606, the administrator console 124 generates a command comprising binaries of the module to be installed (e.g., probes module 136). Subsequently, in one embodiment, the command and the binaries associated with the specified module are saved to the database 118, at 609. In one embodiment, after the command and binaries are saved to the database 118, the authentication module 112 retrieves the command from the database 118, at 612. Subsequently, the authentication module 112 transmits the command to the agent 310 of the specified node 160, at 615, where the agent 310 processes the command, at 618. In one embodiment, after processing the command, the agent 310 executes the updater 320, at 621, which then installs the new binaries in the agent 320, at 624. Further, at 627, the updater 320 restarts the agent 310, and the agent 310 initializes with the new module (i.e., probes module 136), at 330.

FIG. 7 represents a sequence diagram illustrating an exemplary process whereby a correlation module 139 subscribes to receive log messages from one or more collection modules 146. As previously noted, in one embodiment, modules installed on nodes 160 are able to communicate directly (i.e., communications between nodes are not necessarily routed through the central management system 110). As shown in the FIG. 7 embodiment, at 703, the correlation module 139 transmits a collection subscription command to the authentication module 112. In one embodiment, the correlation module 139 transmits the collection subscription command upon connecting to the network managed by the DSIEMS 101. Subsequently, at 706, the authentication module 112 transmits the received command to the agent coordination module 116, which then processes the command, at 709, and determines connection information relating to the correlation module 139. In one embodiment, at 712, the agent coordination module 116 then transmits the connection information relating to the correlation module 139 to the authentication module 112, which then transmits the connection information to all collection modules 146 connected to the network managed by the DSIEMS 101. At 718, collection modules 146 connected to the network process the correlation module's 139 connection information and then, at 721, the collection modules 146 establish a connection with the correlation module 139, in one embodiment. After establishing a connection with the various collection modules 146, the correlation module 139 is able to receive log data, which it can then analyze.

FIG. 8 represents a sequence diagram illustrating an exemplary process whereby a collection module 146 receives and forwards log data to a correlation module 139. According to one embodiment and as previously discussed, nodes 160 may comprise one or more data collection devices for acquiring information relating to various security events. In one embodiment, after collecting such information, a data collection device forwards log data messages to a collection module 146, at 803. Upon receipt of such log data messages, a collection module 146 processes the messages to determine whether the messages should be sent to the correlation module 139 based on conditions configured by an administrator 156, at 806. According to one embodiment, at 809, upon determining that log messages meet predetermined conditions, the collection module 146 transmits log messages directly to the correlation module 139 via the connection established in the process described in relation to FIG. 7. Further, in one embodiment, upon receiving the log messages, the correlation module 139 processes the messages, at 812.

FIG. 9 represents a sequence diagram illustrating an exemplary process whereby a plugin 905 of the correlation module 146 subscribes to receive alert messages. In one embodiment, a plugin of a correlation module transmits an alert subscription command (i.e., request to receive alerts), to the authentication module 112, at 903. In one embodiment, the plugin analyzes alerts and can convert alerts into system incidents. As shown in the FIG. 9 embodiment, at 906, the authentication module 112 transmits the alert subscription command to the agent coordination module 116, which then processes the command, at 909. Subsequently, in one embodiment, the correlation module 139 generates an alert and transmits the alert to the authentication module 112, at 912, whereby the authentication module 112 transmits the alert to the agent coordination module 116, at 915. As shown in the FIG. 9 embodiment, at 918, the agent coordination module 116 determines whether the correlation module plugin 905 is subscribed to then receive the alert message. Upon determination that the plugin 905 is subscribed to receive alert messages, at 921, the agent coordination module 116 transmits the alert to the authentication module 112 to be forwarded to the plugin 905. Subsequently, at 924, the authentication module 112 forwards the alert to the plugin 905, where the plugin 905 receives and processes the alert, at 927.

FIG. 10 represents a sequence diagram illustrating a search query execution and response process according to one embodiment of the present disclosure. In one embodiment, upon determination that a variable is to be updated, a scheduler 340 transmits a message to a preprocessor plugin 1005 requesting a query, at 1003. Subsequently, in one embodiment, the preprocessor plugin 1005 transmits a message with the query request to be executed to the authentication module 112, at 1006, which is then transmitted to the agent coordination module 116, at 1009. In one embodiment, the agent coordination module 116 then processes the message to determine the appropriate search engine to execute the query, at 1012. At 1015, the agent coordination module 116 transmits the query to the authentication module 112 for routing to the proper search engine (e.g., search engine 220), at 1018, according to one embodiment. At 1021, the search engine 220 executes the requested query and transmits the search results to the authentication module 112, at 1024. In one embodiment, the authentication module 112 forwards the search results to the agent coordination module 116, at 1027, which process the results and generates a search results message, at 1030. Subsequently, according to one embodiment, the agent coordination module 116 transmits the search results message to the authentication module 112, at 1033, which then forwards the message to the preprocessor plugin 1005, at 1036. Upon receipt of the message, at 1039, the preprocessor plugin 1005 updates the variable requiring an update, according to one embodiment.

Accordingly, it will be understood that various embodiments of the present system described herein are generally implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernible from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence (s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

What is claimed is:

1. A computer-implemented distributed security information and event management system (DSIEMS) that manages a computer network comprising a plurality of remote nodes configured to collect and process security event information relating to security events occurring on the computer network and provides for dynamic reconfiguration of functionalities of the plurality of remote nodes, comprising:

the plurality of remote nodes within the computer network for executing software modules for implementing one or more of a plurality of selectively configurable security functionalities related to network security monitoring, each remote node comprising a computing device, wherein each node includes core software comprising at least a software agent, an updater, and a client;

the security functionalities including at least a direct node-to-node communication functionality, a collection functionality for collecting security event information, and a correlation functionality that evaluates security event information and generates alerts;

the software agent of a respective remote node comprising an executable responsive to a configuration file received from a central management system to load plugins for a software module, the plugins comprising one or more dynamic link-libraries (DLLs) that effect aspects of at least one selectively configurable functionality on a remote node;

the updater of the respective remote node comprising an executable associated with the software agent of the respective remote node that enables the software agent to install, uninstall, or update plugins for a software module on the respective remote node;

the client of the respective remote node comprising a DLL that effects connectivity between the respective remote node and the central management system and between the respective remote node and another remote node that are both configured with a functionality for direct node-to-node communication;

the central management system for managing the plurality of remote nodes and security event information relating to security events affecting each respective remote node, for providing a configuration file to respective remote nodes to install, uninstall, or update plugins on the respective remote nodes, and for receiving remote node configuration instructions from a user;

a storage system maintained by the central management system that stores security event information identified at each respective remote node;

a communication link between the plurality of remote nodes and the central management system that enables transmission of information between the plurality of remote nodes and the central management system and between nodes that are configured for direct node-to-node communications, and to communicate commands comprising binaries of a software modules to be installed or updated on the remote nodes and configuration files from the central management system to the remote nodes; and in response to the user interacting with the central management system to specify a particular configurable functionality for a specified remote node, the central management system generating a command to the specified remote node to implement the specified configurable functionality, the command comprising binaries of the software module to be installed or updated on the specified remote node and a configuration file;

in response to receipt at the specified remote node of the command from the central management system to implement the specified configurable functionality, the software agent at the specified remote node processing the command by processing the configuration file and executing the updater in accordance with the configuration file to install the binaries of the software module to be installed or updated to effect the specified configurable functionality at the specified remote node;

in response to execution of an installed software module at a specified remote node for effecting a collection functionality at the specified remote node, collecting security event information at the specified remote node;

in response to execution of an installed software module at the specified remote node for effecting a correlation functionality at the specified remote node, subscribing to a collection software module at another remote node to obtain security event information from said another remote node via the direct node-to-node communication functionality;

in further response to execution of the installed software module at the specified remote node for effecting the correlation functionality at the specified remote node, processing the security event information received from the collection module at the said another remote node to generate an alert; and in further response to execution of the installed software module at the specified remote node for effecting the correlation functionality at the specified remote node, generating an alert at the specified remote node and communicating the alert to the central management system.

2. The computer-implemented system of claim 1, wherein the central management system further comprises:
   (i) an authentication module that performs authentication of the plurality of remote nodes within the computer network; and
   (ii) a communication module that handles communications between the plurality of remote nodes and the authentication module.

3. The computer-implemented system of claim 1, further comprising an agent management system that manages a library of plugins for the DSIEMS and effectuates deployment of plugins to the software agents installed on the plurality of remote nodes.

4. The computer-implemented system of claim 3, wherein the agent management system is managed by the central management system.

5. The computer-implemented system of claim 1, wherein one or more of the plurality of remote nodes further comprises a scheduler, wherein the scheduler transmits scheduled commands to software modules maintained within the agent management system that relate to the respective remote node on which the scheduler is installed.

6. The computer-implemented system of claim 1, wherein the plurality of selectively configurable security functionalities for software plugins on the remote nodes is selected from a group comprising but not limited to: data processing, probes, correlation, incident remediation, collection, data storage, communication including direct node-to-node and node-to-central management system, logging, ciphering, XML parsing, authentication, sending/receiving commands, security information functions, event management, fraud management.

7. The computer-implemented system of claim 1, wherein the direct node-to-node communication functionality is effected by a software module installed on one remote node that is able to communicate directly with a software module on another remote node and not necessarily routed through the central management system.

8. The computer-implemented system of claim 1, wherein a correlation module on one remote node receives log messages from one or more collection modules on a plurality of other remote nodes by direct node-to-node communication.

9. The computer-implemented system of claim 8, wherein the correlation module on one remote node transmits a collection subscription command to an agent coordination module at the central management system, wherein the agent coordination module determines connection information relating to the correlation module, wherein the agent coordination module transmits the connection information relating to the correlation module to an authentication module, which then transmits the connection information to the collection modules of the remote nodes connected to the network, whereby the correlation module is thereby able to receive log data from the collection modules.

10. The computer-implemented system of claim 1, further comprising an authentication module associated with the central management system for receiving a request for configuration from a software module at the respective remote node and for communicating a configuration file to the respective remote node in response to a determination that the request from the respective remote node is a configuration request.

11. The computer-implemented system of claim 10, further comprising an agent coordination module associated with the central management system for receiving a configuration request from the authentication module, for determining a proper configuration for the respective remote node that provided the configuration request to the authentication module, retrieving data corresponding to the proper configuration for the requesting respective remote node, and for communicating a configuration file corresponding to the proper configuration for the respective remote node to the authentication module for communication to the requesting respective remote node.

12. The computer-implemented system of claim 10, wherein the software module at the respective remote node provides a configuration request to the authentication module at the central management system upon connection to the DSIEMS for the first time.

* * * * *